3,679,669
PHENYL-1,3,4-OXDIAZOLE COMPOUNDS
Erwin Maeder, Aesch, Basel-Land, and Adolf Emil Siegrist, Basel, Switzerland, assignors to Ciba-Geigy AG, Basel, Switzerland
No Drawing. Continuation of application Ser. No. 658,331, Aug. 4, 1967. This application Sept. 23, 1970, Ser. No. 74,873
Int. Cl. C07d 85/52
U.S. Cl. 260—240 D          11 Claims

ABSTRACT OF THE DISCLOSURE

This invention relates to new phenyl-1,3,4-oxdiazole compounds of the formula

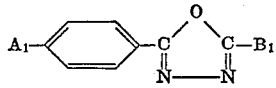

in which $A_1$ is the residue

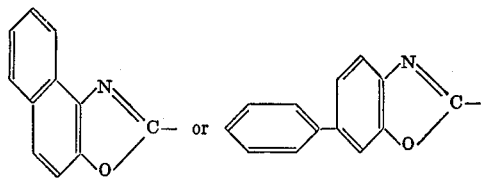

and $B_1$ represents a member selected from the group consisting of a phenyl, diphenylyl, naphthyl, styryl and p-phenylstyryl residue, and these residues $A_1$ and $B_1$, preferably in the terminal phenyl residues, may also contain further non-chromophoric substituents. Such compounds are valuable optical brightening agents for organic materials.

CROSS-REFERENCE TO RELATED APPLICATION

This application is a continuation of Ser. No. 658,331, filed Aug. 4, 1967, now abandoned.

PREFERRED EMBODIMENTS

The present invention provides valuable, new phenyl-1,3,4-oxdiazole derivatives of the general formula (1)

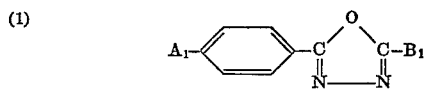

in which $A_1$ is one of the residues

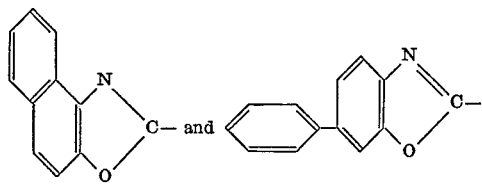

and $B_1$ is a phenyl, diphenylyl, naphthyl, styryl or p-phenylstyryl residue, and these residues $A_1$ and $B_1$, preferably in the terminal phenyl residues, may also contain further non-chromophoric substitutents.

Among the large number of non-chromophoric substituents the following are of special practical value: Halogen atoms, alkyl, alkoxy, cycloalkyl, aralkyl, phenyl, hydroxyl, amino, carboxyl, sulphonic acid groups and their substitutive and functional derivatives. The term substitutive or functional derivatives of such groups as mentioned above refers, for example, to halogenalkyl, hydroxyalkyl, cyanoalkyl, carboxyalkyl, phenylalkyl groups; carboxylic acid esters, amides, halides, nitriles and hydrazides or the sulphonic acid analogues; alkoxy, aralkoxy, phenoxy, hydroxyalkoxy groups; alkylated, arylated, acylated amino groups; amino groups substituted by 1,3,5-triazinyl residues and the like.

Of special practical value among compounds of the above formula are phenyl-1,3,4-oxdiazole compounds of the formula (1a)

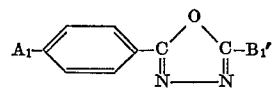

in which $A_1$ is the residue

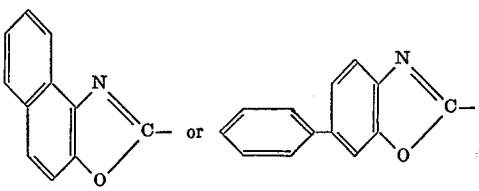

and $B_1'$ represents a phenyl, diphenylyl, naphthyl, styryl, or p-phenylstyryl residue, and terminal phenyl residues of these compounds may contain one or two alkyl groups with 1 to 18 carbon atoms, a halogen atom, an alkoxy group with up to 4 carbon atoms, a carboxyl group, a carboxylic acid alkyl ester group with up to 12 carbon atoms in the alkyl group, or a carboxylic acid amide group.

A valuable sub-group of compounds of the Formula 1 corresponds to the formula (2)

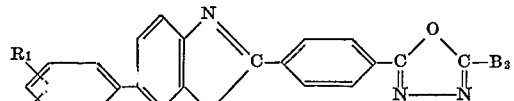

in which $B_2$ is one of the residues

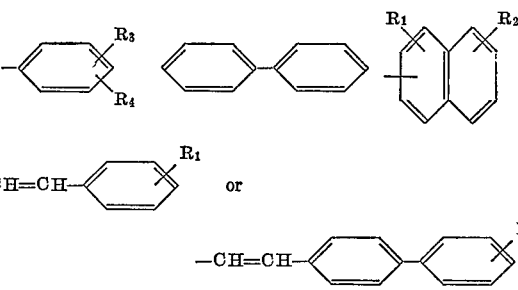

and $R_1$ and $R_2$ are identical or different and each stands for a hydrogen or halogen atom, a lower alkyl or alkoxy group, $R_3$ and $R_4$ for hydrogen or halogen, an alkyl, alkoxy, aralkyl, carboxyl, carbalkoxy, carbonamide group, a nitrile or sulphonic acid group.

Specially valuable are 1,3,4-oxdiazole compounds of the formula (3)

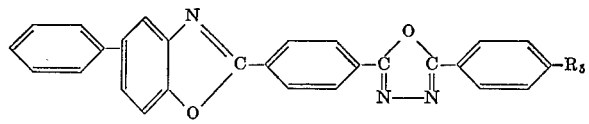

where $R_5$ represents a hydrogen or halogen atom or a phenyl group, a linear or branched alkyl group containing up to 18, preferably 1 to 6 carbon atoms, an alkoxy group containing 1 to 4 carbon atoms, a carboxyl group, a carboxylic acid alkyl ester group containing 1 to 12 carbon atoms in the alkyl residue, or a carboxylic acid amide group, preferably a carboxylic acid morpholide group.

The carboxylic acid alkyl ester groups mentioned in connection with the above Formula 3 contain in general up to 6 carbon atoms in the alkyl residue, and the latter contains, as mentioned, up to 18, preferably up to 6 carbon atoms. The carboxylic acid amide group may be a free or substituted amide group, for example an amide group substituted by alkyl-($C_{1-12}$), cycloalkyl, morpholino or benzyl group.

Groups of compounds of specific value may finally be represented by the formulae (4a)

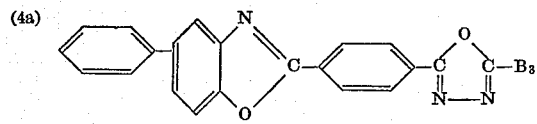

(4b)

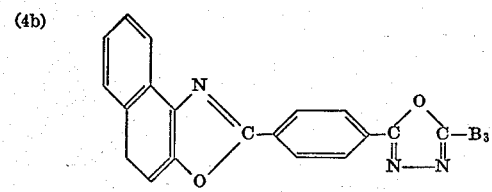

In these formulae $B_3$ represents a phenyl, diphenylyl, p-tertiary butyl-phenyl or styryl group.

The new phenyl - 1,3,4 - oxdiazole derivatives can be manufactured by various known methods.

According to a generally applicable manufacturing process, for example, a carboxylic acid halide (especially chloride) of the Formula 5 is reacted with a carboxylic acid hydrazide of the Formula 6, or a carboxylic acid hydrazide of the Formula 7 is reacted with a carboxylic acid halide (preferably chloride) of the Formula 8, to form an acylhydrazine of the Formula 9 which is then cyclized to form the 1,3,4-oxdiazole. This sequence of reactions can be represented schematically by the following equations (where $A_1$ and $B_1$ have the meanings defined above):

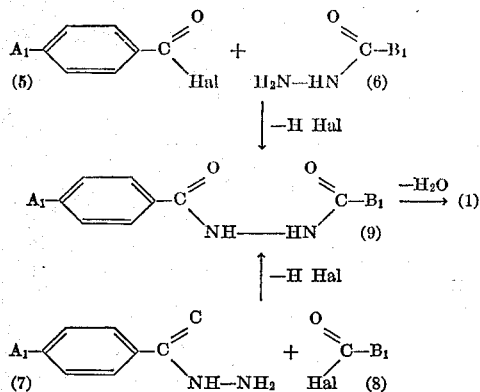

The reaction of the acid halides (5) and (8) with the carboxylic acid hydrazides of the Formulae 6 and 7 to form the acylhydrazine (9) may be carried out in the presence of a tertiary nitrogen base, advantageously at a temperature from 50 to 150° C. It is advantageous to use a tertiary nitrogen base whose boiling point is not too low, preferably one that boils at 100° C. or over, for example N,N-diethylaniline or N,N-dimethylaniline. Particularly suitable are cyclic tertiary nitrogen bases such as quinoline and above all pyridine bases such as pyridine itself and alkylpyridines containing lower alkyls, such as 2-, 3- or 4-methylpyridine (picolines), ethylpyridines or mixtures of such pyridine bases.

Particularly good results have been obtained by performing the reaction giving rise to the acylhydrazine of the Formula 9 in a high-boiling, inert, little polar organic solvent, for example o-dichlorobenzene or chlorobenzene, in the presence of the stoichiometrically needed quantity of a pyridine base, because the following cyclization of the 1,3,4-oxdiazole proceeds rapidly and smoothly, without intermediate isolation of the acylhydrazine, by dropping in slightly more than the stoichiometrically required quantity of thionylchloride at a temperature from 120 to 220° C., advantageously at the boiling temperature of the reaction mixture.

An advantageous process for the manufacture of compounds of the Formula 1a consists in reacting a carboxylic acid hydrazide of the formula (7)

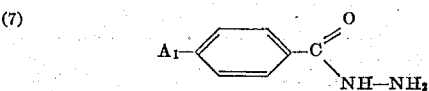

with a carboxylic acid halide of the formula (8a)

in which $A_1$ and $B_1'$ have the above meanings and Hal stands for a halogen atom, preferably chloride, in an organic solvent that is unpolar or weakly polar and inert towards the reactants, in the presence of a tertiary nitrogen base, at a temperature from 50 to 150° C. and, without intermediate isolation of the acylhydrazine, cyclization to the 1,3,4-oxdiazole is carried out by treatment with thionylchloride in an excess over the stoichiometrically required proportion, at a temperature from 120 to 220° C.

The phenyl-1,3,4-oxdiazole derivatives of the Formula 1 obtained by the process described may, if desired, be further reacted to furnish compounds that likewise correspond to the Formula 1. Thus, water-soluble derivatives are obtained by sulphonating phenyl - 1,3,4-oxdiazole derivatives of the Formula 1; when one or several primary or secondary amino groups of the phenyl-1,3,4-oxdiazole derivatives are converted into the corresponding alkylsulphonic acid derivatives; are converted with aldehydebisulphite compounds into the corresponding ω-methanesulphonic acid derivatives; or are reacted with alkylsulphonic or aralkylsulphonic acids; or in one or several hydroxyl groups a polyalkylene ether chain, which is sufficiently long to ensure solubility in water, is introduced with an alkylene oxide or with a polyalkylene ether monohalide; or one or several groups capable of quaternation are treated with quaternating agents at an elevated temperature, if necessary under pressure; or one or several halogenalkyl groups are reacted with tertiary bases to furnish the corresponding quaternary derivatives.

The new phenyl-oxdiazoles of the composition defined above possess in the dissolved or finely disperse state a more or less pronounced fluorescence. They may be used for optically brightening a wide variety of high-molecular or low-molecular organic materials or materials containing organic substances.

Accordingly, the present invention provides also a process for optically brightening a wide variety of organic materials (suitable for optical brightening; they may be of a textile or non-textile nature), characterized in that the new phenyl-1,3,4-oxdiazole compounds corresponding to one of the Formulae 1 to 4 are incorporated with or applied to the surface of the material to be optically brightened.

As examples of suitable organic materials the following groups of organic materials may be mentioned without intending any restriction thereto:

(I) Synthetic organic materials of high molecular weight such as:

(a) Polymerization products based on organic compounds containing at least one polymerizable carbon-to-carbon double bond, that is to say their homopolymers or copolymers as well as their after-treating products (for example crosslinking, grafting or decomposition products; diluted polymers) for example polymers based on α,β-unsaturated carboxylic acids especially of acrylic compounds, of olefinic hydrocarbons, polymers based on vinyl and vinylidene compounds, of halogenated hydrocarbons, of unsaturated aldehydes and ketones, allyl compounds and the like;

(b) Other polymerization products obtainable, for example, by ring opening, for instance polyamides of the polycaprolactam type, also formaldehyde polymers, or polymers accessible by polyaddition or polycondensation, such as polyethers, polythioethers, polyacetals, thioplasts;

(c) Polycondensation products or precondensates based on bifunctional or polyfunctional compounds containing condensable groups, their homocondensates and cocondensates as well as their after-treatment products, such, for example, as polyesters (saturated or unsaturated, linear or branched), polyamides, maleinate resins, their precondensates and similarly constituted products; polycarbonates, silicone resins and the like;

(d) Polyadducts, such as polyurethanes (crosslinked and not crosslinked); epoxy resins.

(II) Semisynthetic organic materials, for example, cellulose esters, nitrocellulose, cellulose ethers, regenerated cellulose or their after-treatment products; casein synthetics.

(III) Natural organic materials of animal or vegetable origin, for example those based on cellulose or proteins such as wool, cotton, silk, leathers, finely divided wood pulp, natural resins, also rubber, gutta percha, balata and their after-treatment and modification products.

The organic materials concerned may be at widely differing stages of their processing (raw materials, semi-finished products or finished products) and physical states. They may be in the form of products shaped in a wide variety of ways, that is to say, for example, as predominantly three-dimensional objects such as blocks, panels, sections, tubes, injection mouldings or components of a great variety, chips or granules, foamed products; predominantly two-dimensional materials such as films, foils, lacquers, tapes, impregnations or coatings, or predominantly unidimensional materials such as filaments, fibres, flocks, bristles or wires. The said materials may also be in unshaped states in a wide variety of homogeneous forms of distribution and physical states, for example in the form of powders, solutions, emulsions, dispersions, latices (examples: lacquer solutions, polymer dispersions) sols, gels, putties, pastes, waxes, adhesive or pore fillers, and the like.

Fibrous materials may be, for example, monofils, staple fibres, flocks, hanks, textile threads, yarns, fibre fleeces, felts, padding, flocculated materials or as textile fabrics or textile laminates, knitwear, papers, cardboards, paper pulps and the like.

The compounds to be used according to this invention are of special value for the treatment of textile organic materials, especially woven textile fabrics. When fibres which may be in the form of staple fibres, monofils, hanks, fabrics, tricots, fleeces, napped substrates or textile laminates are to be optically brightened by the present process, this is advantageously done in an aqueous medium in which the chosen compound is finely dispersed (suspended or, if desired, dissolved). If desired, there may be added to the treatment liquor a usual dispersant. It has been found particularly advantageous to work in a neutral, weakly alkaline or acid bath. Likewise, it is advantageous to perform the treatment at a temperature from about 50 to 100° C., for example at the boiling temperature of the bath or in its vicinity (at about 90° C.). The improving treatment according to this invention may also be carried out with solutions in organic solvents.

Furthermore, the new optical brighteners to be used in this invention may be added to, or incorporated with, the materials before or during their shaping. Thus, for example, in the manufacture of films, foils, tapes or mouldings they may be added to the moulding or injection moulding composition etc. or they may be dissolved, dispersed or in any other way finely distributed in the spinning mass before spinning. The optical brighteners may also be added to the starting materials, reaction mixtures or intermediate products used to produce fully synthetic or semi-synthetic organic materials, that is to say also before or during the chemical reaction, e.g. a polycondensation (including the precondensates) a polymerization (including the prepolymers) or a polyaddition.

The new optical brighteners can, of course, also be used wherever organic materials of the kind indicated above are combined with inorganic materials in any shape or form (typical examples: detergents, white pigments in organic substances).

The new optical brighteners are distinguished by their particularly good heat resistance and fastness to light and to migration.

The amount of the new optical brightener to be used according to this invention, referred to the weight of the material to be optically brightened, may vary within wide limits. Even very small amounts, in some cases for instance as little as 0.001% by weight, may suffice to produce a distinct and durable effect, though it is also possible to use amounts of up to about 0.5% by weight or more. For most practical purposes an amount ranging from 0.01 to 0.2% by weight will be acceptable The new compounds, to be used as brightening agents, may also be applied, for example, as follows:

(a) In admixture with dyestuffs or pigments or as additives to dyebaths, or printing, discharge or reserve pastes. Also for after-treating dyeings, prints or discharge prints.

(b) In admixture with so-called "carriers," antioxidants, light filters, heat stabilizers, chemical bleaches or as additives to bleaching baths.

(c) In admixture with cross-linking agents, dressings such as starch or synthetic dressings. In may also be of advantage to add the products of this invention to the liquors used for producing an anti-crease finish.

(d) In combination with detergents. The detergents and the optical brightener may be added separately to the washing liquor. It is also advantageous to use detergents that as such already contain a share of brightening agent. Suitable detergents are e.g. soaps, salts of sulphonate washing agents e.g. of sulphonated benzimidazoles substituted on the carbon atom 2 by higher alkyl radicals, also salts of monocarboxylic acid esters of 4-sulphophthalic acid with higher fatty alcohols, also salts of fatty alcohol sulphonates, alkylarylsulphonic acids or condensation products of higher fatty acids with aliphatic hydroxysulphonic or aminosulphonic acids. Furthermore, there may be used non-ionic detergents e.g. polyglycol ethers derived from ethylene oxide and higher fatty alcohols, alkylphenols or fatty amines.

(e) In combination with polymeric vehicles (polymers, polycondensates or polyadducts) in which the brightening agent, if desired in addition to other substances, is incorporated in the dissolved or dispersed form, for example in the case of coatings, impregnating or binding agents (solutions, dispersions, emulsions) for textile materials, fleeces, papers or leathers.

(f) As additives to a wide variety of industrial products to improve their presentation or to obviate disadvantages in their use, for example as additives to glues, adhesives, paints or the like.

The compounds of the above formula can also be used as scintillators for various photographic purposes, such as electrophotographic reproduction or for supersensitizing.

If the brightening operation is to be combined with other treating or improving operations, the combined treatment is advantageously performed with the use of a suitable stable preparation which contains in addition to optically brightening compounds of the above general formula also dispersants, detergents, carriers, dyestuffs, pigments or dressing agents.

The treatment of the polyester fibres with the brighteners of this invention may also be, for example, performed by impregnating these fibres with an aqueous dispersion of the brighteners at a temperature below 75° C., e.g. at room temperature, and then subjecting them to a dry heat treatment at a temperature above 100° C. In general, it is of advantage first to dry the impregnated fibrous material at a moderately raised temperature, e.g. at a temperature from at least 60° C. to about 100° C. The heat treatment of the dry material is then advantageously carried out at 120 to 225° C., for example by heating in a drying chamber, by ironing within the indicated temperature range or by treatment with dry, superheated steam. If desired, the drying and the dry heat treatment may follow immediately upon each other or they may be performed in a single stage.

EXAMPLE 1

6.6 grams of 4-[6'-phenyl-benzoaxazolyl-(2')]-benzhydrazide of the formula

(10)
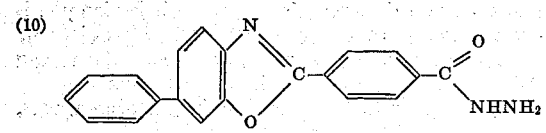

are suspended in 60 ml. of anhydrous o-dichlorobenzene at room temperature. Then 2 ml. of anhydrous pyridine are added and while stirring well, 2.8 g. of benzylchloride are dropped in. The reaction mixture is heated to 140 to 150° C. within 2 to 3 hours, and at this temperature 5 ml. of thionylchloride are dropped in within 15 minutes. The batch is stirred on for 20 to 30 minutes, whereupon a slightly turbid solution is obtained. The excess thionylchloride and the bulk of the solvent are then evaporated under vacuum, the residue is diluted with alcohol, and the crystalline precipitate is suctioned at room temperature and rinsed with alcohol and dried, to yield 7.6 g. of dirty-yellowish flakes melting at 254 to 255° C. Crystallization from xylene with the aid of active carbon furnishes 7.0 g.

(13)

of the compound of the formula

(11)
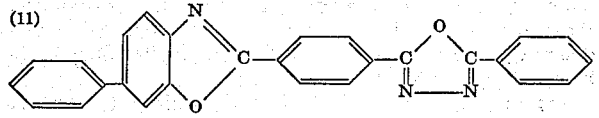

in the form of lemon-coloured flakes melting at 254.5 to 255° C.

$C_{27}H_{17}O_2N_3$ (molecular weight 415.45).—Calculated (percent): C, 76.06; H, 4.12; N, 10.11. Found (percent): C, 78.02; H, 4.31; N, 9.93.

The 4-[6' - phenyl-benzoxazolyl - (2')]-benzhydrazide used as starting material can be prepared thus:

A suspension of 180 g. of terephthalic acid monomethyl ester in 1400 ml. of o-dichlorobenzene is mixed with 1 ml. of pyridine and 300 ml. of thionylchloride and heated slowly to 80 to 90° C., whereupon a strong evolution of hydrochloric gas sets in. The batch is stirred for 3 to 4 hours at this temperature, after which practically no more hydrochloric gas is being given off and a clear solution is obtained.

The excess thionylchloride is then evaporated under reduced pressure. The batch is allowed to cool to 50 to 60° C., and 185 g. of 4-amino-3-hydroxydiphenyl are introduced into the well stirred solution, whereupon a thick suspension is obtained which is difficult to stir. Within 3 hours the whole is evenly heated to 175 to 180° C., with a strong evolution of hydrochloric gas setting in above 100° C. A thinly liquid suspension results.

3 grams of boric acid are added and within 2 hours the bulk of the solvent is evaporated under nitrogen and atmospheric pressure. The temperature of the reaction mixture gradually rises during this evaporation and water passes over as an azeotrope. At 230° C. a clear, dark melt is obtained which is allowed to cool to about 120° C. and ½ litre of methanol is vigorously stirred in. The precipitate formed is suctioned off at room temperature, rinsed with methanol, thoroughly expressed and dried. The brown powder is then dissolved in methylenechloride, filtered through 1 kg. of activated alumina and evaporated to dryness. Crystallization from xylene furnishes 185 g. of the benzoxazolyl compound of the formula

(12)
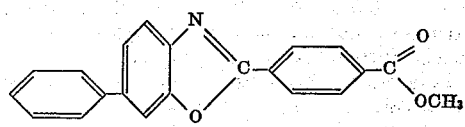

as a light-beige powder melting at 224 to 225° C.

The benzoxazolyl compound of the Formula 12 is mixed with 200 ml. of hydrazinehydrate in 700 ml. of ethyleneglycol monomethyl ether and stirred and refluxed for 12 hours, whereupon a thickly liquid suspension is obtained which is cooled to room temperature, suctioned and the residue is rinsed with alcohol. The residue is dissolved hot in dimethylformamide, a turbidity is filtered off, the filtrate is concentrated and allowed to cool. The crystalline precipitate is suctioned off, washed with dimethylformamide and methanol and dried, to yield 117 g. of the carboxylic acid hydrazide of the formula

(10)
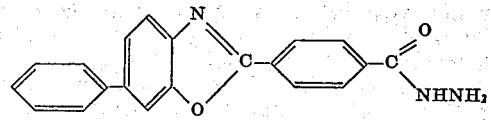

as an almost colourless powder melting at 288° C. with decomposition.

In an analogous manner the following benzoxazolyl-oxdiazolyl compounds are accessible:

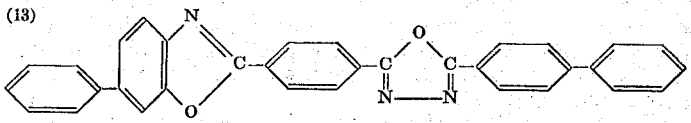

Yellowish flakes from dimethylformamide, melting at 290–291° C.

$C_{33}H_{21}O_2N_3$ (molecular weight 491.55).—Calculated (percent): C, 80.64; H, 4.31; N, 8.55. Found (percent): C, 80.76; H, 4.40; N, 8.79.

(14)
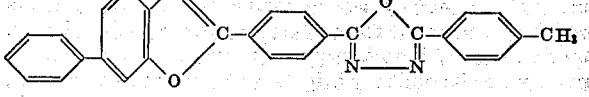

Pale yellow flakes from xylene, melting at 259–260° C.

$C_{28}H_{19}O_2N_3$ (molecular weight 429.46).—Calculated (percent): C, 78.31; H, 4.46; N, 9.79. Found (percent): C, 78.39; H, 4.27; N, 9.92.

(15)
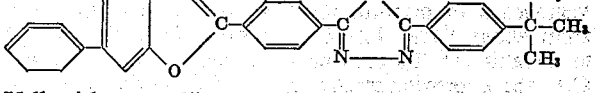

Yellowish, crystalline powder from dimethylformamide, melting at 247–248° C.

$C_{31}H_{25}O_2N_3$ (molecular weight 471.53).—Calculated (percent): C, 78.96; H, 5.34; N, 8.91. Found (percent): C, 78.78; H, 5.24; N, 9.11.

(16)
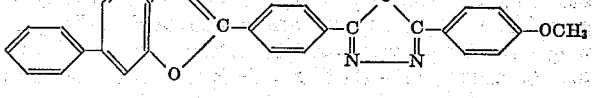

Light-yellow flakes from dimethylformamide, melting at 246–247° C.

$C_{28}H_{19}O_2N_3$ (molecular weight 445.46).—Calculated (percent): C, 75.49; H, 4.30; N, 9.43. Found (percent): C, 75.47; H, 4.27; N, 9.68.

(17) 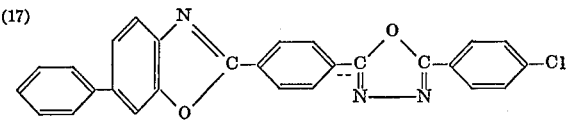

Pale yellow flakes from chlorobenzene, melting at 293–294° C.

$C_{27}H_{16}O_2N_3Cl$. (molecular weight 449.90).—Calculated (percent): C, 72.08; H, 3.58; N, 9.34. Found (percent): C, 72.38; H, 3.71; N, 9.37.

(18) 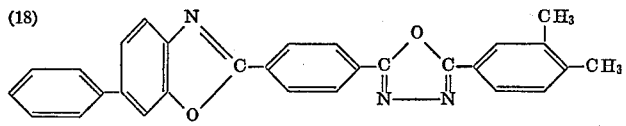

Light yellow, small needles from xylene, melting at 236–237° C.

$C_{29}H_{21}O_2N_3$ (molecular weight 443.48).—Calculated (percent): C, 78.54; H, 4.77; N, 9.48. Found (percent): C, 78.73; H, 4.96; N, 9.59.

(19) 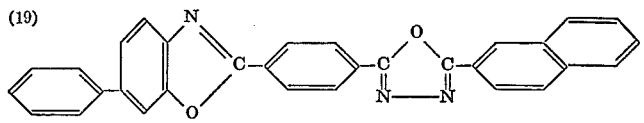

Pale yellow flakes from chlorobenzene, melting at 260–261° C.

$C_{31}H_{19}O_2N_3$ (molecular weight 465.49).—Calculated (percent): C, 79.98; H, 4.11; N, 9.03. Found (percent): C, 79.47; H, 4.09; N, 9.25.

(20) 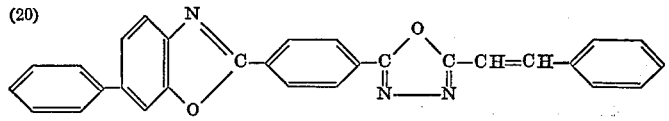

Light yellow flakes from chlorobenzene, melting at 275–276° C.

$C_{29}H_{19}O_2N_3$ (molecular weight 441.47).—Calculated (percent): C, 78.89; H, 4.34; N, 9.52. Found (percent): C, 79.17; H, 4.23; N, 9.58.

(21) 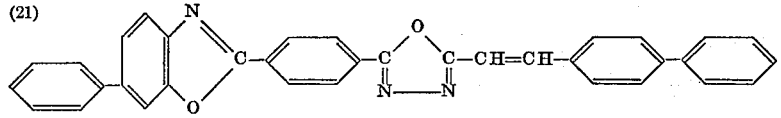

Pale yellow, small needles from chlorobenzene, melting at 300–302° C.

$C_{35}H_{23}O_2N_3$ (molecular weight 517.59).—Calculated (percent): C, 81.22; H, 4.48; N, 8.12. Found (percent): C, 81.23; H, 4.52; N, 8.23.

(22) 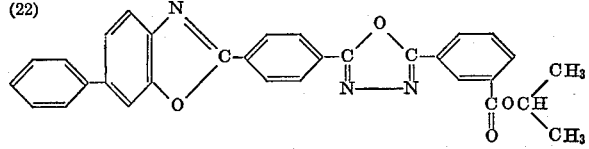

Pale yellow flakes from xylene, melting at 202–203° C.

$C_{31}H_{23}O_4N_3$ (molecular weight 501.52).—Calculated (percent): C, 74.24; H, 4.62; N, 8.38. Found (percent): C, 74.49; H, 4.65; N, 8.44.

EXAMPLE 2

5 grams of the compound of the Formula 22 in 150 ml. of ethyleneglycol monomethyl ether are heated to the reflux temperature, whereupon a slightly turbid solution is obtained. While stirring it well, a solution of 1 g. of caustic soda in 10 ml. of water is dropped in within 5 minutes, and an orange-yellow thick suspension forms; it is maintained for another 15 minutes at the reflux temperature, then 30 ml. of 10% hydrochloric acid are added and the whole is diluted with water, suction-filtered at room temperature and the filter cake is thoroughly expressed and washed neutral with water. The residue is dissolved in dimethylformamide, a turbidity is filtered off, and the filtrate is concentrated and allowed to cool, suctioned, washed with a small amount of dimethylformamide and methanol and dried, to yield 3.1 g. of the benzoxazolyl-oxdiazolyl compound of the formula

(23) 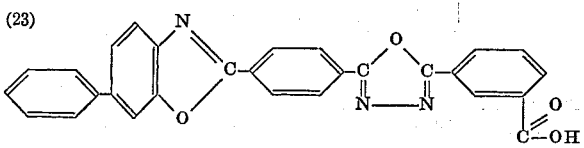

as an almost colourless, finely crystalline powder melting at 340–341° C.

$C_{28}H_{17}O_4N_3$ (molecular weight 459.44).—Calculated (percent): C, 73.19; H, 3.73; N, 9.15. Found (percent): C, 73.23; H, 3.84; N, 9.19.

EXAMPLE 3

2 grams of the compound of the Formula 23 in 50 ml. of o-dichlorobenzene are heated at 90 to 100° C. with 15 ml. of thionylchloride and 3 drops of pyridine until hydrochloric gas is no longer being evolved, whereupon a pale-yellow, thinly liquid suspension is obtained. The excess thioylchloride is distilled off under reduced pressure. Then, at 90° C., 10 ml. of anhydrous pyridine and 4 ml. of morpholine are added and the batch is heated within 30 minutes to 130° C.; a weakly turbid solution forms. The bulk of the solvent is then evaporated under reduced pressure and the residue diluted with alcohol.

The precipitate formed is suctioned off at room temperature, rinsed with alcohol and dried, to yield 2.2 g. of a greyish white crystalline powder melting at 279 to 280°

C. Crystallization from dimethylformamide and from xylene furnishes 1.9 g. of the compound of the formula (24)

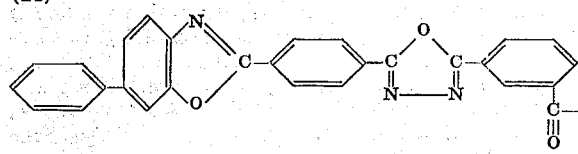
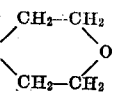

as yellowish flakes melting at 279 to 280° C.

$C_{32}H_{24}O_4N_4$ (molecular weight 528.54).—Calculated (percent): C, 72.71; H, 4.58; N, 10.60. Found (percent): C, 73.00; H, 4.59; N, 10.77.

EXAMPLE 4

A mixture of 7.58 g. of 4-[naphth(2:1)-oxazolyl-(2′)]-benzoic acid hydrazide of the formula (25)

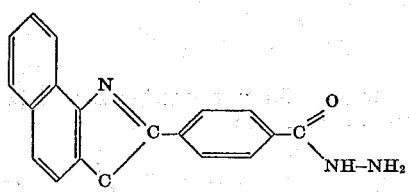

4.15 g. of cinnamic acid chloride, 8 g. of pyridine and 200 ml. of anhydrous o-dichlorobenzene is heated within 30 minutes to 100 to 105° C. while being stirred, then stirred on for 1 hour at this temperature and then heated to 165 to 170° C. within 30 minutes. While vigorously stirring the light-yellow solution of the reaction product at 165 to 170° C., 8 g. of thionylchloride are dropped in within 15 minutes. The batch is stirred on for 5 minutes at this temperature, then cooled to 10° C. and during the cooling 200 ml. of methanol are added. The precipitated 1,3,4-oxdiazole derivative of the formula (26)

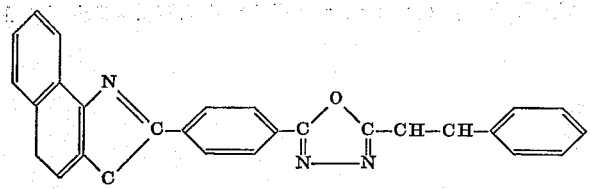

is suctioned off, washed with methanol and dried, to yield about 7.05 g. (=67.4% of theory) of a light-yellow powder melting at 258 to 262° C. Three recrystallizations from dimethylformamide with the aid of active carbon furnish about 3.7 g. of pale yellow, felted needles melting at 264 to 264.5° C.

$C_{27}H_{17}O_2N_3$ (molecular weight 415.45).—Calculated (percent): C, 78.06; H, 4.12; N, 10.11. Found (percent): C, 78.08; H, 4.18; N, 10.03.

In a similar manner the 1,3,4-oxidazole derivative of the formula

27)

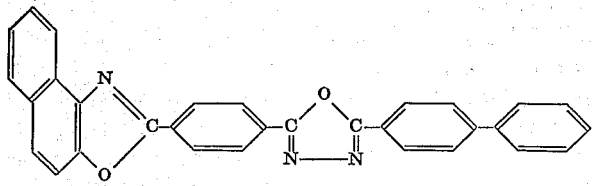

can be prepared in a yield of 65.8% of theory. It forms pale-yellow, small needles from o-dichlorobenzene, melting at 296.5 to 297° C.

$C_{31}H_{19}O_2N_2$ (molecular weight 465.49).—Calculated (percent): C, 79.93; H, 4.11; N, 9.03. Found (percent): C, 79.88; H, 4.14; N, 9.19.

The 4-[naphth(2:1)-oxazolyl-(2′)]-benzoic hydrazide of the Formula 25 used as starting material can be prepared thus:

A mixture of 63.6 g. of 1-amino-2-hydroxynaphthalene, 79.5 g. of benzene-1-carboxylic acid methyl ester-4-carboxylic acid chloride and 400 ml. of anhydrous dichlorobenzene is heated with exclusion of air in the course of 3½ hours gradually to 160° C. Then 2 g. of boric acid are added and the temperature is raised to about 200 to 210° C., whereby the o-dichlorobenzene is distilled off almost completely. The brown reaction solution is diluted during the subsequent cooling first with 200 ml. of dioxane and then with 200 ml. of methanol. The whole is cooled to 1° C., suctioned, washed with cold methanol and dried, to yield about 115.8 g. (=95.4% of theory) of 4-[naphth(2:1)-oxazolyl-(2′)]-benzoic acid methyl ester in the form of a bright, yellowish powder which melts at 198 to 199° C. For purification the ester is recrystallized from tetrachlorethylene with the aid of bleaching earth and then sublimed under a high vacuum, whereby it forms an almost colourless, finely crystalline powder melting at 203° C.

$C_{19}H_{13}O_3N$ (molecular weight 303.30).—Calculated (percent): C, 75.24; H, 4.32; N, 4.62. Found (percent): C, 75.47; H, 4.26; N, 4.63.

A mixture of 151.5 g. of the methyl ester, 750 ml. of diethyleneglycol diethyl ether and 50 g. of hydrazinehydrate is stirred for 24 hours at 110 to 115° C., then cooled, diluted with 1 litre of methanol, suctioned, washed with methanol and dried, to yield about 151.2 g. (=99.8% of theory) of 4-[napth(2:1)-oxazolyl-(2′)]-benzoic acid hydrazide in the form of a pale yellow, finely crystalline powder melting above 400° C.

EXAMPLE 5

10 kg. of a polyamide in chip form, prepared in known manner from hexamethylenediamine adipate, are mixed with 30 g. of titanium dioxide (rutile modification) and 5 g. of one of the compounds of the Formula 11, 13, 15, 16 or 20 for 12 hours in a tumbler. The chips treated in this manner are then melted with steam in a boiler, from which the atmospheric oxygen has been displaced by steam and which is heated at 300 to 310° C. with oil or diphenyl vapour, and stirred for half an hour. The melt is then expressed through a spinneret under a nitrogen pressure of 5 atmospheres (gauge) and the resulting, cooled filament is wound on a spinning bobbin. The resulting filaments display an excellent brightening effect of good fastness to washing and light.

When the polyamide from hexamethylenediamine adipate is replaced by a polyamide manufactured from ε-caprolactam, similar, good results are achieved.

EXAMPLE 6

100 grams of polyester granulate from polyterephthalic acid ethyleneglycol ester are intimately mixed with 0.05 g. of the compound of the Formula 13 and melted at 285° C. while being stirred. On spinning the spinning mass through conventional spinnerets and stretching, strongly brightened polyester fibres are obtained.

If desired, the compound of the Formula 13 may alternatively be added to the starting materials before or during the polycondensation leading to the polyester.

What is claimed is:
1. A compound of the formula

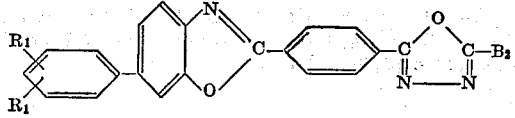

where $B_2$ is a residue selected from the group consisting of

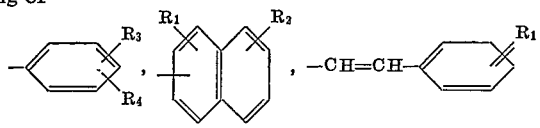

and

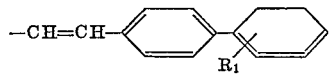

and $R_1$ and $R_2$ are identical or different and each represents a hydrogen or halogen atom, a lower alkyl or alkoxy group, $R_3$ and $R_4$ each stands for a hydrogen or halogen atom, or for an alkyl having 1 to 18 carbon atoms, alkoxy having 1 to 4 carbon atoms, carboxyl, carbalkoxy with up to 12 carbon atoms in the alkyl portion, carboxylic acid morpholide, nitrile or sulphonic acid group.

2. A compound according to claim 1 of the formula

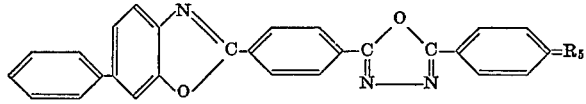

in which $R_5$ represents a hydrogen or halogen atom, a linear or branched alkyl group containing up to 18 carbon atoms, an alkoxy group containing up to 4 carbon atoms, a carboxyl group, a carboxylic acid alkyl ester group with 1 to 12 carbon atoms in the alkyl residue or a carboxylic acid morpholide group.

3. A compound according to claim 1 of the formula

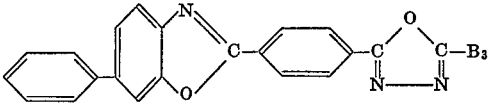

in which $B_3$ represents a member selected from the group consisting of the phenyl, p-tertiary butyl-phenyl and the styryl group.

4. A compound according to claim 1 wherein $R_1$, $R_2$, $R_3$, and $R_4$ are hydrogen.

5. A compound according to claim 1 of the formula

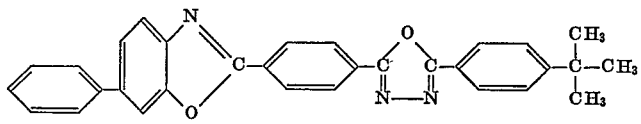

6. A compound according to claim 1 of the formula

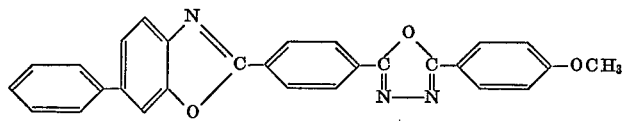

7. A compound according to claim 1 of the formula

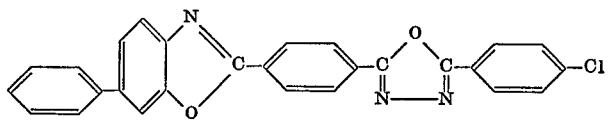

8. A compound according to claim 1 of the formula

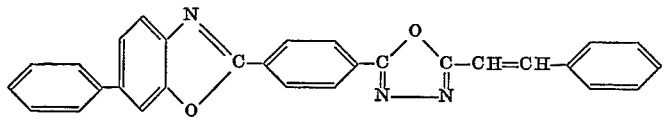

9. A compound according to claim 1 of the formula

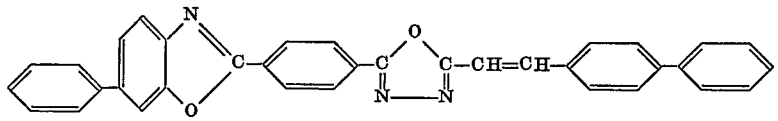

10. A compound according to claim 1 of the formula

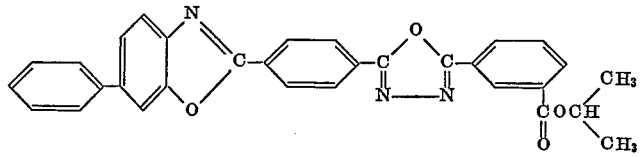

11. A compound according to claim 1 of the formula

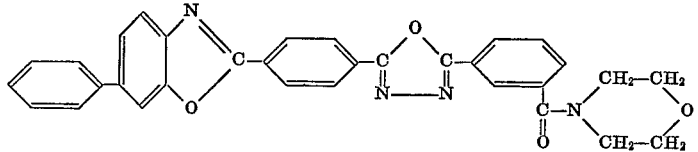

References Cited

UNITED STATES PATENTS 3,444,179   5/1969   Siegrist et al. _____ 260—307

HENRY R. JILES, Primary Examiner

G. T. TODD, Assistant Examiner

U.S. Cl. X.R.

106—193 D; 117—33.5 R; 252—301.2 W; 260—37 N, 41 C, 41.5 R, 307 D